United States Patent
Danielsson et al.

(10) Patent No.: US 10,379,233 B2
(45) Date of Patent: Aug. 13, 2019

(54) THERMAL MANAGEMENT OF PHOTON-COUNTING DETECTORS

(71) Applicant: Prismatic Sensors AB, Stockholm (SE)

(72) Inventors: Mats Danielsson, Taby (SE); Staffan Karlsson, Bromma (SE); Xuejin Liu, Taby (SE)

(73) Assignee: PRISMATIC SENSORS AB, Stockholm (SE)

( * ) Notice: Subject to any disclaimer, the term of this patent is extended or adjusted under 35 U.S.C. 154(b) by 107 days.

(21) Appl. No.: 15/484,705

(22) Filed: Apr. 11, 2017

(65) Prior Publication Data
US 2018/0292551 A1 Oct. 11, 2018

(51) Int. Cl.
| | | |
|---|---|---|
| G01T 1/16 | (2006.01) | |
| G01T 7/00 | (2006.01) | |
| G01T 1/29 | (2006.01) | |

(52) U.S. Cl.
CPC .............. *G01T 7/005* (2013.01); *G01T 1/16* (2013.01); *G01T 1/2985* (2013.01)

(58) Field of Classification Search
CPC .................................. G01T 1/16; G01T 7/005
See application file for complete search history.

(56) References Cited

U.S. PATENT DOCUMENTS

| | | | |
|---|---|---|---|
| 5,693,948 A | 12/1997 | Sayed et al. | |
| 6,931,092 B2 | 8/2005 | Joshi et al. | |
| 7,065,173 B2 | 6/2006 | Lacey et al. | |
| 7,236,562 B2 | 6/2007 | Joshi et al. | |
| 7,381,964 B1 | 6/2008 | Kump et al. | |
| 8,476,594 B2 | 7/2013 | Frach et al. | |
| 8,779,907 B2 | 7/2014 | Liu et al. | |
| 9,086,360 B2 | 7/2015 | Joshi et al. | |
| 9,223,038 B2 | 12/2015 | Hannemann et al. | |
| 2015/0312999 A1* | 10/2015 | Takahashi | H05G 1/10 378/92 |
| 2016/0174920 A1 | 6/2016 | Lacey et al. | |
| 2016/0324494 A1 | 11/2016 | Roessl et al. | |

OTHER PUBLICATIONS

Alvarez and Macovski. Energy-selective reconstructions in X-ray computerised tomography. Phys. Med. Biol., 21(5):733, 1976.

(Continued)

*Primary Examiner* — Mark R Gaworecki
(74) *Attorney, Agent, or Firm* — Young & Thompson

(57) ABSTRACT

An X-ray detector system includes a photon-counting detector with multiple detector modules including a respective power-consuming circuitry. At least some of the detector modules include a temperature sensor to monitor a temperature on the detector module and generate a temperature representing signal. A detector controller selectively switches, for at least a subset of the detector modules, the detector modules between an idle mode in which at least a respective part of the detector modules is powered off and an operational mode in which the detector modules are powered on. The power-consuming circuitries of the at least a subset of detector modules generate calibration data based on the temperature representing signals to correct for any temperature-induced changes to image data generated by the photon-counting detector.

20 Claims, 11 Drawing Sheets

(56) References Cited

OTHER PUBLICATIONS

Roessl and Proksa. K-edge imaging in X-ray computed tomography using multi-bin photon counting detectors. Phys. Med. Biol., 52(15):4679, 2007.
Liu, Grönberg, Sjölin, Karlsson and Danielsson, "Count rate performance of a silicon-strip detector for photon-counting spectral CT", Nucl. Instr. and Meth. A, vol. 827, p. 102-106. 2016.
Gustaysson, Amin, Bjorklid, Ehliar, Xu and Svensson. A high-rate energy-resolving photon-counting ASIC for spectral computed tomography. IEEE Transactions on Nuclear Science, 59(1), 30-39, 2012.
Bomefalk, Persson, Xu, Karlsson, Svensson and Danielsson, "Effect of Temperature Variation on the Energy Response of a Photon Counting Silicon CT Detector", IEEE Trans. Nucl. Sci., 60(2):1442-1449, 2013.

\* cited by examiner

THERMAL MANAGEMENT OF PHOTON-COUNTING DETECTORS

TECHNICAL FIELD

The present embodiments generally relate to photon-counting detectors and X-ray detector systems comprising such photon-counting detectors, and in particular to thermal management of photon-counting detectors.

BACKGROUND OF THE INVENTION

A modern clinical Computed Tomography (CT) system consists in short of a fan-beam geometry with an X-ray source or tube facing an arc-shaped detector. An acquisition of a large number of X-ray projections at different angles around a patient is performed by rotating the source and the detector continuously over 360 degrees within sub second. Both the attenuated (after the patient) and the unattenuated (before the patient) X-ray intensities are recorded, from which a 3D spatial distribution of the linear attenuation coefficients within the patient is reconstructed, accurately delineating organs and tissues.

The detector is one of the most important components of a CT system. Scintillation detectors, which consist of scintillators coupled to photodiodes, are most frequently used in modern CT systems. In these detectors, an interacting X-ray photon is first converted to scintillation lights in the scintillators. Electron-hole pairs are generated through the absorption of scintillation lights in photodiodes. The energy deposited by the interacting photons over a certain exposure time is integrated to obtain electrical signals output by the photodiodes that are proportional to the total deposited energy. In this way, the electronic noise produced by detector elements in the detector and readout electronics is also integrated into the output signals that are transmitted to the data processing system via analog to digital converting application-specific integrated circuits (ASICs) for image reconstruction.

Components within the energy-integrating detector, such as scintillation detector, are very temperature sensitive, in particular the photodiodes. For instance, if the photodiodes are made of silicon, the dark current from the bulk silicon, which is a major source of the electronic noise, will be doubled for every 8° C. temperature increase. It is, thus, desirable to maintain the energy-integrating detector at a controlled temperature both during its operation and system calibration to avoid image quality issues that may be caused by temperature drifts in the detector components.

Methods and devices for thermal control in a modern CT detector typically employ coolers and/or heaters to provide a constant temperature environment while the detector electronics are turned on continuously [1-4]. A typical operating temperature for an energy-integrating detector is higher than 36° C. [5] with its allowance for variation less than 0.5° C.

Photon-counting detectors that may be used in the next generation X-ray and CT imaging systems to work in a totally different way as compared to the energy-integrating detectors. Incident X-ray photons are directly transferred to electrical pulses with pulse amplitudes proportional to the photon energies. These electrical pulses are then fed into the corresponding ASIC channels. Each ASIC channel typically contains a charge-sensitive pre-amplifier, a pulse shaper, a number of pulse-height comparators and counters. After being amplified and shaped, each electrical pulse is compared to a number of programmable thresholds and classified according to its pulse-height, and the corresponding counter is incremented.

Compared to the energy-integrating detectors, photon-counting detectors have the following advantages. Firstly, electronic noise that is integrated into the signal by the energy-integrating detectors can be rejected by setting the lowest energy threshold above the noise floor in the photon-counting detectors. Secondly, material decomposition, by which different components in the examined patient can be identified and quantified, is ready to be implemented by using the energy information extracted by the detector [6]. Thirdly, more than two basis materials can be used which benefits decomposition techniques, such as K-edge imaging whereby distribution of contrast agents, e.g., iodine or gadolinium, are quantitatively determined [7]. Last but not least, higher spatial resolution can be achieved by using smaller pixel size. Compared to the typical pixel size of 1 $mm^2$ of current energy-integrating detectors, photon-counting detectors usually use sub square millimeter pixel size. For instance, a silicon-strip photon-counting detector can hold a pixel size of 0.2 $mm^2$ [8].

The most promising materials for photon-counting X-ray detectors are cadmium telluride (CdTe), cadmium zinc telluride (CZT) and silicon. CdTe and CZT are employed in several photon-counting spectral CT projects for the high absorption efficiency of high-energy X-rays used in clinical CT. However, these projects are slowly progressing due to several drawbacks of CdTe/CZT. CdTe/CZT have low charge carrier mobility, which causes severe pulse pileup at flux rates ten times lower than those encountered in clinical practice. One way to alleviate this problem is to decrease the pixel size, whereas it leads to increased spectrum distortion as a result of charge sharing and K-escape. Also, CdTe/CZT suffer from charge trapping, which would lead to polarization that causes a rapid drop of the output count rate when the photon flux reaches above a certain level.

In contrast, silicon has higher charge carrier mobility and is free from the problem of polarization. The mature manufacturing process and comparably low cost are also its advantages. But silicon has limitations that CdTe/CZT does not have. Silicon sensors must be very thick to compensate for its low stopping power. Typically, a silicon sensor needs a thickness of several centimeters to absorb most of the incident photons, whereas CdTe/CZT needs only several millimeters. On the other hand, the long attenuation path of silicon also makes it possible to divide the detector into different depth segments that are read out individually. This in turn increases the detection efficiency and makes a silicon-based photon-counting detector possible to properly handle the high fluxes in CT.

However, the employment of detector elements in depth segments also brings problems to the silicon-based photon-counting detector. A large number of ASIC channels have to be employed to process data fed from the detector elements. Each of these ASIC channels typically has a power consumption of several milliwatts [9]. A full photon-counting detector with a total area larger than 200 $cm^2$ can consist of millions of such ASIC channels, which means that the total power consumption of the ASICs is on the level of thousands of watts. Consequently, silicon-based photon-counting detectors impose a challenge for the thermal management system since a lot of heat is generated by the photon-counting detector and has to be transported away, for example by water-cooling or advanced air conditioners, which will be expensive.

The prior art thermal management systems that are committed to maintain a general constant temperature environment for an energy-integrating detector will not be suitable for a photon-counting detectors. Accordingly, there is a need for a thermal management adapted for photon-counting detectors.

SUMMARY OF THE INVENTION

It is a general objective to provide an efficient thermal management for photon-counting detectors.

This and other objectives are met by embodiments as disclosed herein.

An aspect of the embodiments relates to an X-ray detector system. The X-ray detector system comprises a photon-counting detector comprising multiple detector modules. Each detector module comprises power-consuming circuitry and at least a subset of the multiple detector modules comprises a temperature sensor configured to monitor a temperature on the detector module and generate a temperature representative signal. The X-ray detector system also comprises a detector controller connected to the photon-counting detector. The detector controller is configured to selectively switch, for at least a subset of the multiple detector modules, the detector modules between an idle mode in which at least a respective part of the detector modules is powered off and an operational mode in which the detector modules are powered on. The power-consuming circuitries of the at least a subset of the detector modules are configured to generate calibration data based on a respective temperature representative signal to correct for any temperature-induced changes to image data generated by the photon-counting detector.

Another aspect of the embodiments relates to a method of thermal control of an X-ray detector system. The method comprises monitoring temperatures on at least a subset of multiple detector modules in a photon-counting detector. The method also comprises generating, for each detector module of the at least a subset of the multiple detector modules, a temperature representing signal based on the monitoring. The method further comprises selectively switching, for at least a subset of the multiple detector modules, the detector modules between an idle mode in which at least a respective part of the detector modules is powered off and an operational mode in which the detector modules are powered on. The method additionally comprises generating calibration data based on a respective temperature representative signal to correct for any temperature-induced changes to image data generated by the photon-counting detector.

A further aspect of the embodiments relates to a computer program comprising instructions, which when executed by at least one processor, cause the at least one processor to selectively switch, for at least a subset of multiple detector modules in a photon-counting detector, the detector modules between an idle mode in which at least a respective part of the detector modules is powered off and an operational mode in which the detector modules are powered on. The at least one processor is also caused to generate, based on a respective temperature representing signal representing a respective temperature on at least a subset of the multiple detector modules, calibration data to correct for any temperature-induced changes to image data generated by the photon-counting detector.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The present embodiments achieve an efficient thermal management of photon-counting detectors by selectively switching at least a respective part of at least a subset of the detector modules between a low power idle mode and a power-consuming operational mode during an X-ray imaging session. In the idle mode, the photon-counting detector consumes significantly less power and thereby generates far less heat than in the operational mode. The selective switches between the idle and operational modes, however, cause temperature gradients in the detector modules causing temperature-induced changes to the image data generated by the photon-counting detector. Accordingly, calibration data is generated based on temperature monitoring on the detector modules to correct for any such temperature-induced changes caused by the temperature gradients arising from the selective switches between the idle and operational modes.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

The present embodiments generally relate to photon-counting detectors and X-ray detector systems comprising such photon-counting detectors, and in particular to thermal management of photon-counting detectors.

The prior art technology of maintaining X-ray detectors at a general constant temperature environment is not suitable for usage in connection with photon-counting detectors comprising multiple detector modules. In a typical real-time situation, such a photon-counting detector would include power-consuming circuitry, such as ASICs, that would have a total power consumption in the order of thousands of watts. This in turn implies that a lot of heat is generated by the power-consuming circuitry and the detector modules and needs to be transported away by the thermal management system, such as water-cooling and/or advanced air conditioner equipment. The performance of such thermal management system then needs to be very high in order to be able to keep the photon-counting detector at a constant temperature, which results in large cost and large space for the thermal management system. As a further shortcoming, such thermal management system are typically less reliable as compared to the X-ray imaging system, causing shut down of the complete X-ray imaging system if malfunctioning.

Present embodiments solve the above short-comings by selectively switching detector modules of the photon-counting detector between an idle mode and an operational mode. The idle mode is a power saving mode in which at least a part of detector modules is powered off to reduce power consumption and thereby heat generation. In the operational mode the detector modules are powered on and can thereby detect incident photons from an X-ray source. The selective switches between the idle and the operational modes to thereby power off and on at least parts of at least a subset of the detector modules, however, generate temperature gradients in the photon-counting detector and the detector modules. These temperature gradients may negatively cause temperature-induced or -dependent changes to image data generated by the photon-counting detector and output by the detector modules. The embodiments, however, solve these changes induced by the temperature gradients arising from the selective switches between the idle and operational modes by generating calibration data based on the current temperatures of the detector modules. This means that the present embodiments can compensate for the temperature-induced changes to the image data by the generation of calibration data.

Accordingly, the present embodiments achieve an efficient thermal management in a photon-counting detector comprising multiple detector modules, which thermal management does not cause a significant deterioration in the performance of the photon-counting detector or in the image data output by the photon-counting detector.

Figure 1:
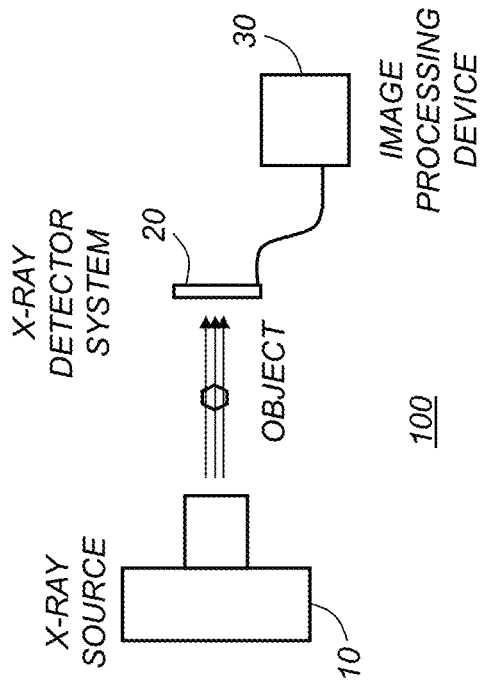
FIG. 1 is a schematic block diagram of an X-ray imaging system according to an embodiment.

It may be useful with a brief overview of an illustrative overall X-ray imaging system with reference to FIG. 1. In this illustrative but non-limiting example, the X-ray imaging system 100 basically comprises an X-ray source 10, an X-ray detector system 20 and an associated image processing device 30. In general, the X-ray detector system 20 is configured to register radiation from the X-ray source 10, which optionally has been focused by optional X-ray optics and passed an object, a subject or a part thereof. The X-ray detector system 20 is connectable to the image processing device 30 via suitable power-consuming circuitry to enable the image processing and/or image reconstruction by the image processing device 30.

Figure 2:
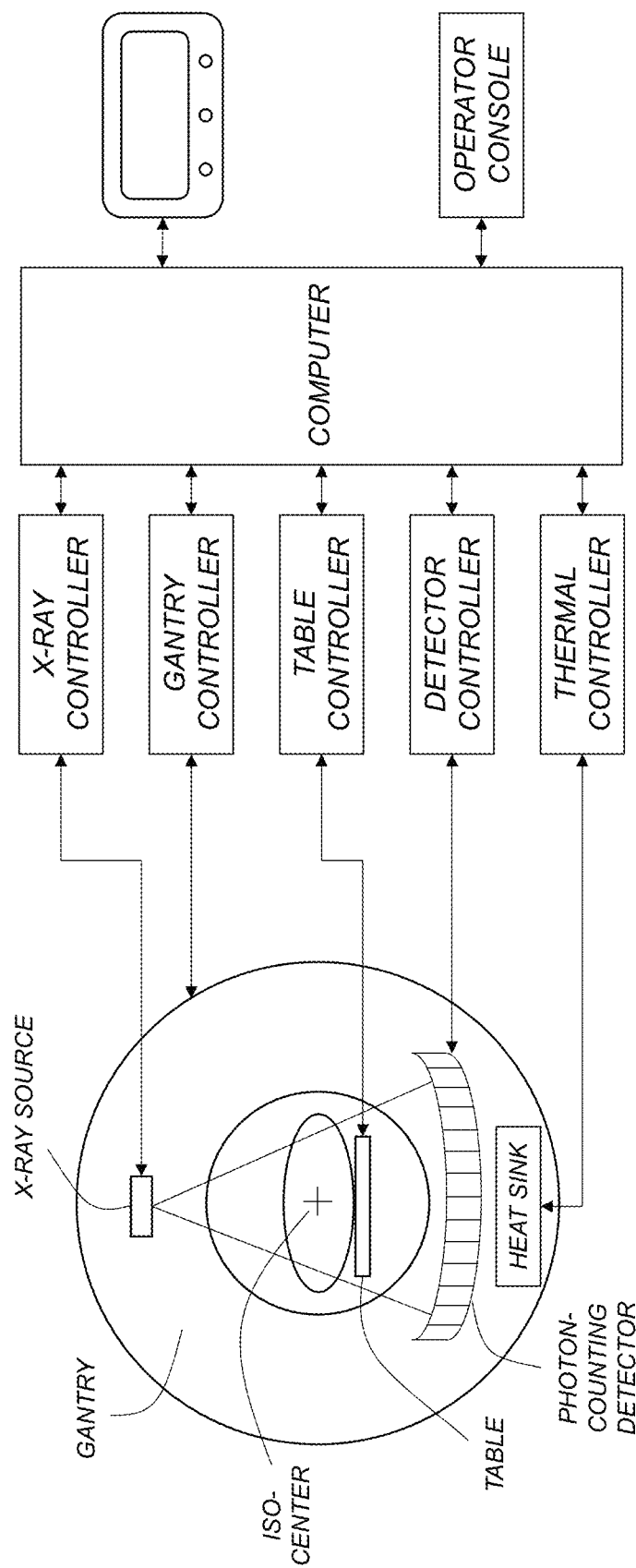
FIG. 2 is a schematic block diagram of an X-ray imaging system according to another embodiment.

FIG. 2 is a schematic block diagram of a CT system as an illustrative example of an X-ray imaging system. The CT system comprises a computer receiving commands and scanning parameters from an operator via an operator console that has a display and some form of operator interface, e.g., keyboard and mouse. The operator supplied commands and parameters are then used by the computer to provide control signals to an X-ray controller, a gantry controller and a table controller. To be specific, the X-ray controller provides power and timing signals to the X-ray source to control emission of X-rays onto the object or patient lying on the table. The gantry controller controls the rotational speed and position of the gantry comprising the X-ray source and the photon-counting detector. The table controller controls and determines the position of the patient table and the scanning coverage of the patient.

In an embodiment, the computer also performs post-processing and image reconstruction of the image data output form the photon-counting detector. The computer thereby corresponds to the image processing device as shown in FIG. 1. The associated display allows the operator to observe the reconstructed images and other data from the computer.

The X-ray source arranged in the gantry emits X-rays. An X-ray detector, in the form of a photon-counting detector, detects the X-rays after they have passed through the patient. The photon-counting detector is formed by plurality of sensors, also referred to as detector elements, and the associated power-consuming circuitry, such as ASICs, arranged in detector modules. The ASICs comprises an analog processing part, which processes the raw electrical signal from the detector elements and digitizes it, and a digital processing part, which may carry out further processing operations on the measured data, such as applying corrections, storing it temporarily, or filtering. The photon-counting detector is further connected to a cooling zone or heat sink, whereby the heat generated by the ASICs can be dissipated efficiently. During a scan to acquire X-ray projection data, the gantry and the components mounted thereon rotate about an iso-center.

Figure 3:
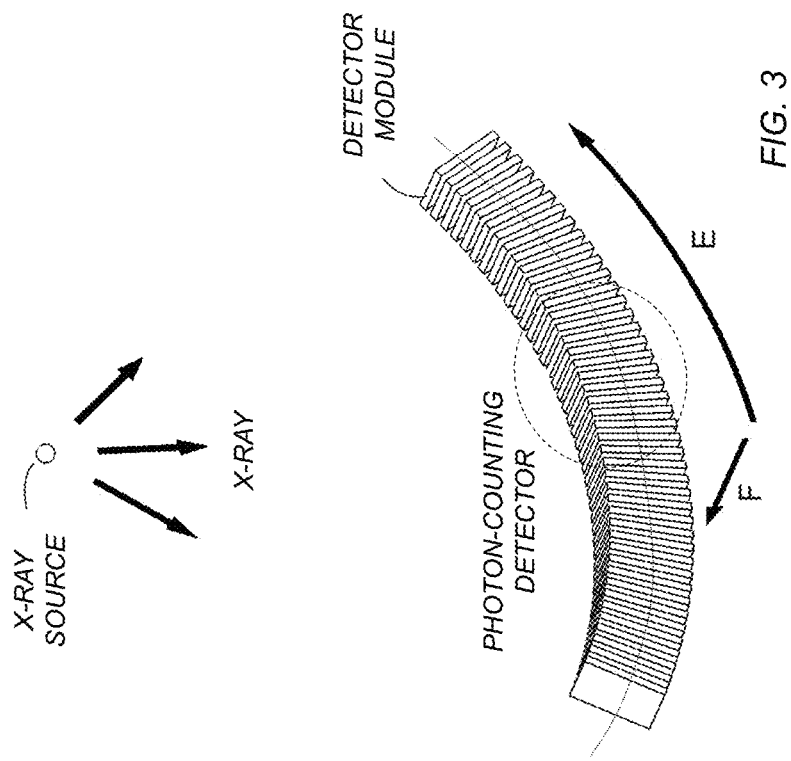
FIG. 3 is a schematic diagram of a photon-counting detector according to an embodiment.

The X-ray detector of the embodiments is a photon-counting detector comprising multiple detector modules. FIG. 3 is a schematic diagram of a photon-counting detector according to an exemplary embodiment. In this example, there is shown a schematic view of a photon-counting detector with X-ray source emitting X-rays. The detector modules of the photon-counting detector are preferably arranged in a slightly curved overall configuration. Two possible scanning motions E, F of the photon-counting detector are indicated. In each scanning motion, the X-ray source may be stationary or moving. In the scanning motion indicated by E the X-ray source and photon-counting detector may be rotated around an object or patient positioned in between. In the scanning motion indicated with F the photon-counting detector and the X-ray source may be translated relative to the object or the patient, or the object or patient may be moving. Also in scan motion E the object or patient may be translated during the rotation, so called spiral scanning. By way of example, for CT implementations, the X-ray source and photon-counting detector may be mounted in a gantry that rotates around the object or patient to be imaged.

Figure 4:
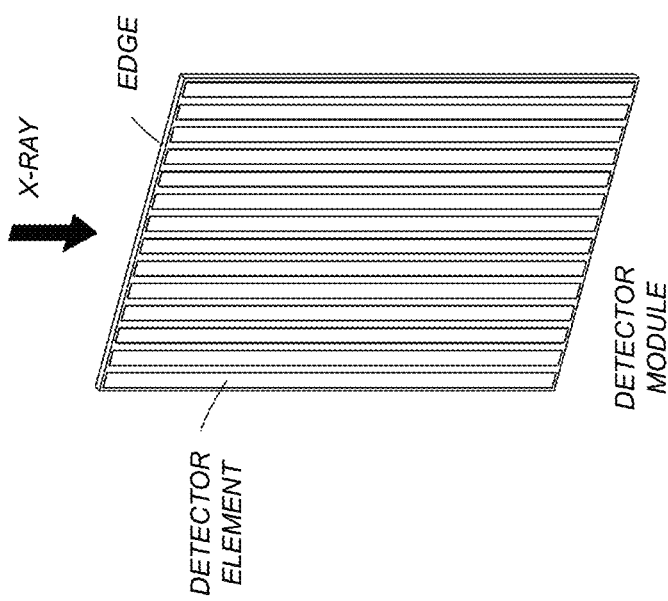
FIG. 4 is a schematic diagram of a detector module of a photon-counting detector according to an embodiment.

FIG. 4 is a schematic diagram illustrating an example of a detector module of a photon-counting detector according to an exemplary embodiment. This is an example of a semiconductor detector module with the sensor part split into detector elements in the form of strips, where each detector element is normally based on a diode. The X-rays enter through the edge of the semiconductor detector module.

Figure 5:
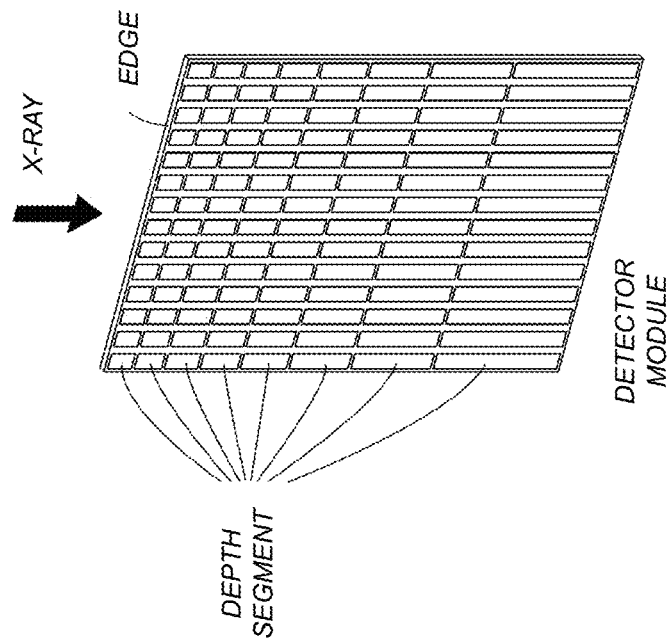
FIG. 5 is a schematic diagram of a detector module of a photon-counting detector according to another embodiment.

FIG. 5 is a schematic diagram illustrating an example of detector module according to another exemplary embodiment. In this example, the strip-based detector elements of the semiconductor detector module are split into so-called depth segments in the depth direction, again assuming the X-rays enter through the edge.

Figure 6:
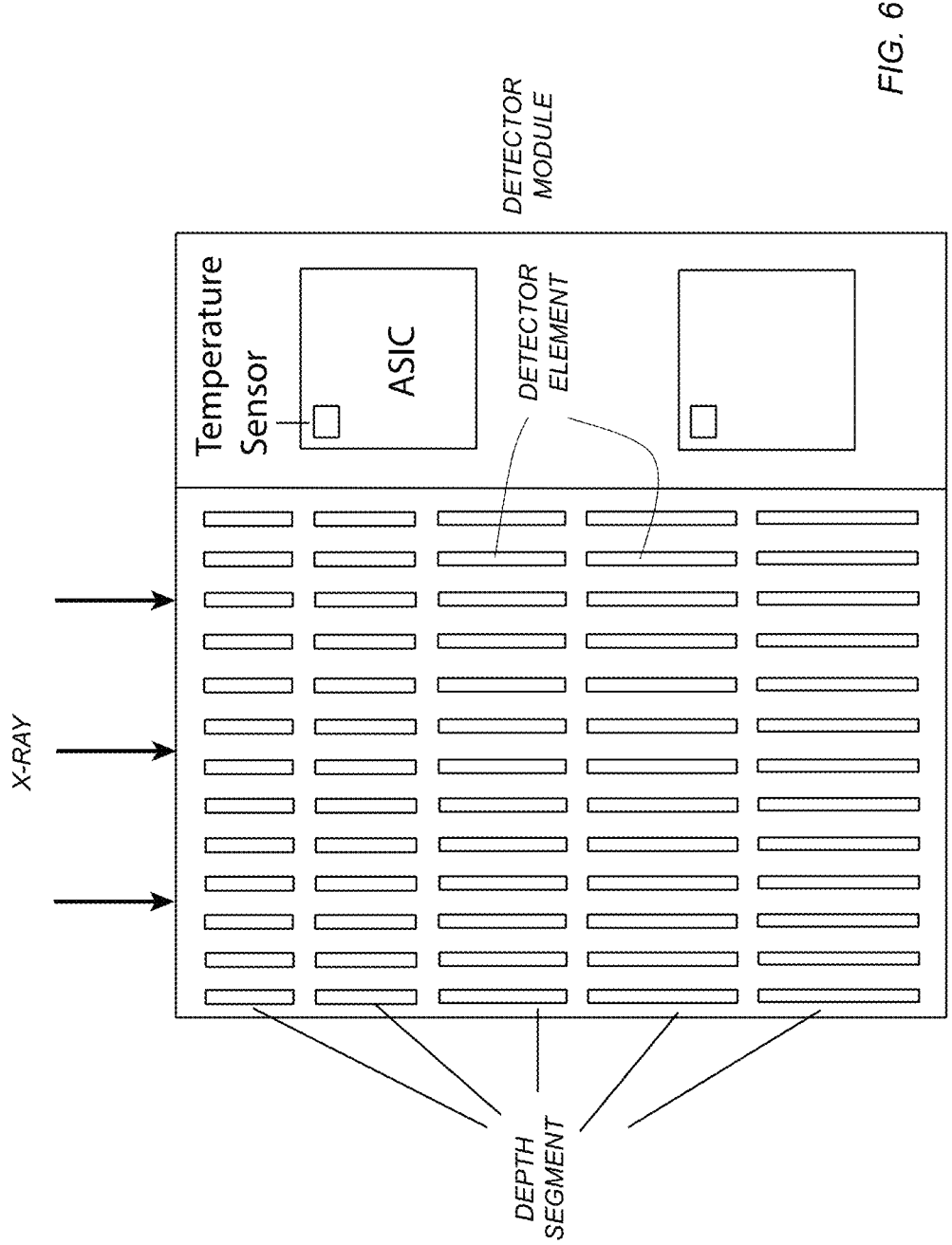
FIG. 6 is a schematic diagram of a detector module of a photon-counting detector according to a further embodiment.

The detector modules may be implemented as so-called Multi-Chip Modules (MCMs) in the sense that the detector modules have semiconductor base substrates for electric routing and for a number of ASICs, see FIG. 6. The routing will include a connection for the signal from each detector element to the ASIC input as well as connections from the ASIC to external memory and/or digital data processing (not shown). Power to the ASICs may be provided through similar routing taking into account the increase in cross-section which is required for the large currents in these connections, but the power may also be provided through a separate connection.

In an embodiment, the photon-counting detector is fabricated based on silicon as semiconductor material for the detector modules.

Hence, in an embodiment, the photon-counting detector comprises multiple semiconductor detector modules. In a particular embodiment, the photon-counting detector comprises multiple silicon detector modules.

To compensate for the low stopping power of silicon, the detector modules are typically oriented in edge-on geometry with their edge directed towards the X-ray source as shown in FIGS. 4-6, thereby resulting in an absorption thickness of several centimeters. In order to cope with the high photon fluxes in clinical CT, a segmented structure of the strip-based detector elements into depth segments is preferably applied, which is achieved by implanting individual detector elements in depth segments on the silicon substrate as shown in FIGS. 5 and 6. Each individual detector element, sometimes referred to as electrode, is connected to a subsequent ASIC channel where a MCM technology is employed to integrate the ASICs and electric routing on the silicon substrate.

In an embodiment, the photon-counting detector is a photon-counting edge-on detector and each detector module has a respective edge facing incident X-rays. In a particular embodiment, a total area of the edges of the multiple detector modules is greater than 200 $cm^2$. This large total area of the edges provides a sufficient detector area for the photon-counting edge-on detector.

The employment of depth segments and individual read-out in the detector module result in a large number of ASIC channels. Moreover, a full photon-counting detector for CT applications typically has a total area greater than 200 $cm^2$, which results in a large number of detector modules, such as 1500-2000 detector modules, as schematically illustrated in FIG. 3.

As a consequence, the photon-counting detector will contain a very large number of power-consuming and thereby heat-generating ASICs, and thereby generally consume more power than the prior art flat panel CT detectors. If such a photon-counting detector is turned on continuously as it is in the current CT system, it will be a challenge for the thermal management system to keep the detector modules of the photon-counting detector at constant temperature and transport away the heat generated by the power-consuming ASICs in the detector modules.

An aspect of the embodiments thereby relates to an X-ray detector system. The X-ray detector system comprises a photon-counting detector comprising multiple detector modules. Each detector module comprises power-consuming circuitry. At least a subset of the multiple detector modules comprises a temperature sensor, see FIG. 6. The temperature sensor is configured to monitor a temperature on the detector module and generate a temperature representative signal.

The X-ray detector system also comprises a detector controller connected to the photon-counting detector, see FIG. 2. The detector controller is configured to selectively switch, for at least a subset of the multiple detector modules, the detector modules between an idle mode and an operational mode. In the idle mode at least a respective part of the detector modules is powered off. Correspondingly, in the operational mode the detector modules are powered on.

The power-consuming circuitries of the at least a subset of the detector modules are configured to generate calibration data based on a respective temperature representative signal to correct for any temperature-induced changes to image data generated by the photon-counting detector.

In an embodiment, the temperature representative signal generated by the temperature sensor is representative of a current temperature on the detector module as determined based on the temperature monitoring. The temperature representative signal is then used by the power-consuming circuitries of the detector modules to compensate for temperature gradients caused by selectively switching the detector modules between the low-power consuming mode, i.e., idle mode, in which a low amount of heat is generated by the power-consuming circuitries, and the full-power consuming mode, i.e., operational mode, in which a comparatively larger amount of heat is generated by the power-consuming circuitries. These temperature gradients in the detector modules of the photon-counting detector will result in temperature-induced changes and deteriorations in the image data output by the detector modules. Accordingly, the present embodiments compensate for the temperature gradients by generating calibration data based on the temperature representative signals from the temperature sensors. The calibration data will thereby compensate for the temperature-induced changes to thereby generate temperature-compensated or -corrected image data by the photon-counting detector.

In an embodiment, each temperature sensor is integrated in a respective power-consuming circuitry of the at least a subset of the multiple detector modules as shown in FIG. 6. In such a case, each power-consuming circuitry, represented by ASIC in the figure, could comprises a respective temperature sensor. Alternatively, only a subset of the power-consuming circuitries, such as ASICs, per detector module comprises a respective temperature sensor. For instance, only one ASIC per detector module could comprise a temperature sensor.

It is also possible to have the temperature sensor(s) arranged elsewhere on the detector modules than integrated in the power-consuming circuitries. For instance, the temperature sensor could be arranged on the semiconductor substrate.

In an embodiment, the temperature representative signal generated by a temperature sensor is output to and used by a single power-consuming circuitry, preferably the power-consuming circuitry in which the temperature sensor is integrated. In another embodiment, the temperature representative signal of a temperature sensor is output to and used by multiple, i.e., at least two, power-consuming circuitries in the detector module. In such a case, these at least power-consuming circuitries use the same temperature representative signal to generate respective calibration data.

For instance, a detector module could comprise a single temperature sensor. In an embodiment, the single temperature sensor is integrated in the front-end power-consuming circuitry, i.e., the power-consuming circuitry of the detector module that is closest to the edge facing the X-rays.

In an embodiment, each power-consuming circuitry is a respective ASIC as shown in FIG. 6.

In an embodiment, each temperature sensor is an oscillator-based temperature sensor configured to measure a frequency change in an oscillator implemented in a respective power-consuming circuitry of the at least a subset of the multiple detector modules. Such an implementation of a temperature sensor is in particular suitable for integration in an ASIC.

In an embodiment, the photon-counting detector is a so-called energy-discriminating or energy-resolving photon-counting detector, sometimes referred to as a spectral X-ray detector. In this embodiment, see FIG. 7, each registered photon generates a current pulse which is compared to a set of thresholds ($T_1$-$T_N$), thereby counting the number of photons incident in each of a number of energy bins.

Figure 7:
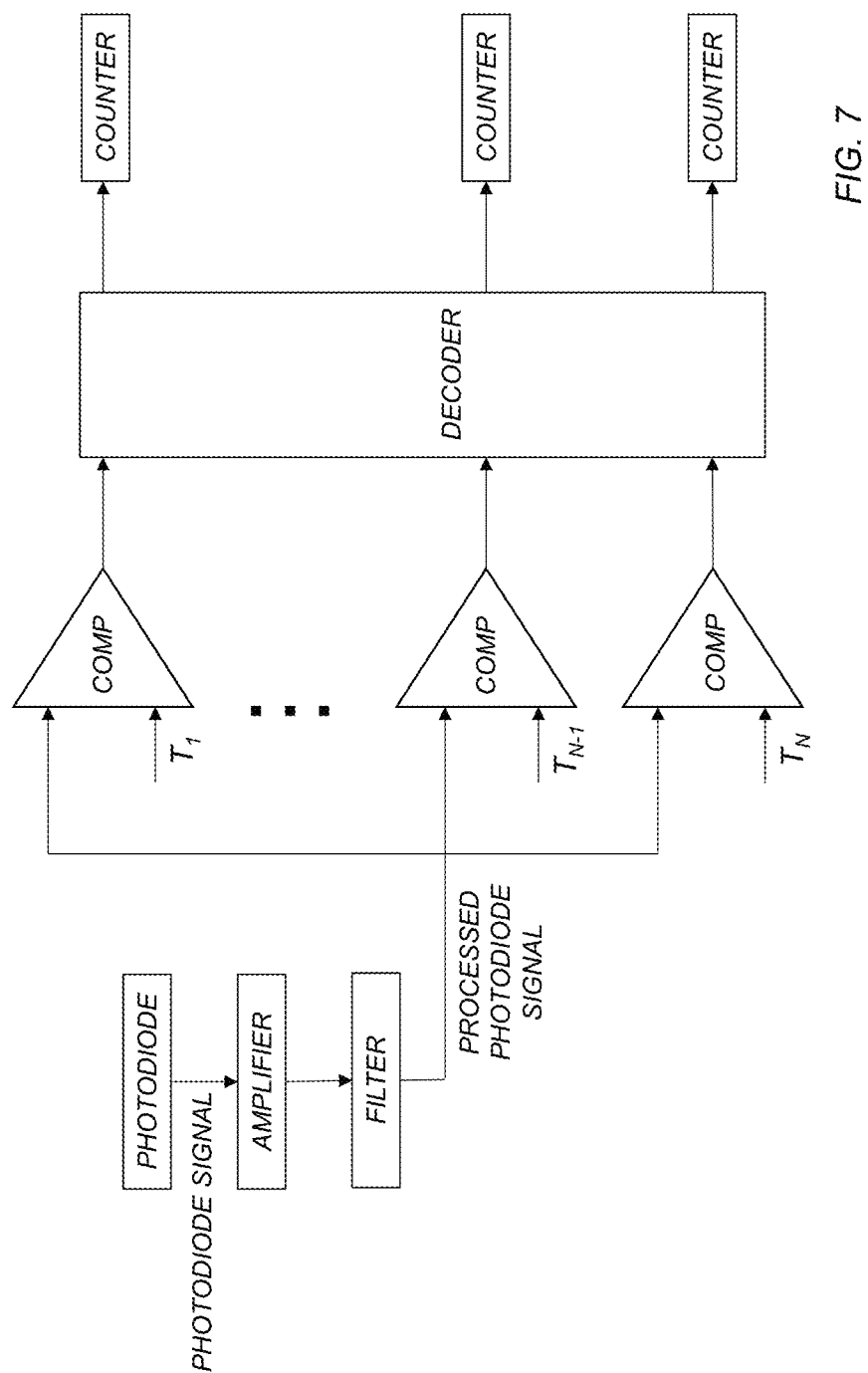
FIG. 7 is a schematic diagram of a photon-counting detector with several energy thresholds.

In general, the X-ray photons, including also photons after Compton scattering, are converted to electron-hole pairs inside the semiconductor substrate of the detector modules, where the number of electron-hole pairs is generally proportional to the photon energy. The electrons and holes are drifting towards the detector elements, then leaving the photon-counting detector. During this drift, the electrons and holes induce an electrical current in the detector elements, a current which may be measured, e.g., through a Charge Sensitive Amplifier (CSA), followed by a Shaping Filter (SF), as schematically illustrated in FIG. 7.

As the number of electrons and holes from one X-ray event is proportional to the X-ray energy, the total charge in one induced current pulse is proportional to this energy. The current pulse is amplified in the CSA and then filtered by the SF filter. By choosing an appropriate shaping time of the SF filter, the pulse amplitude after filtering is proportional to the total charge in the current pulse, and therefore proportional to the X-ray energy. Following the SF filter, the pulse amplitude is measured by comparing its value with one or several threshold values ($T_1$-$T_N$) in one or more comparators (COMP), and counters are introduced by which the number of cases when a pulse is larger than the threshold value may be recorded. In this way it is possible to count and/or record the number of X-ray photons with an energy exceeding an energy corresponding to respective threshold value ($T_1$-$T_N$) which has been detected within a certain time frame.

When using several different threshold values, a so-called energy-discriminating photon-counting detector is obtained, in which the detected photons can be sorted into energy bins corresponding to the various threshold values. Sometimes, this type of photon-counting detector is also referred to as a multi-bin detector.

In general, the energy information allows for new kinds of images to be created, where new information is available and image artifacts inherent to conventional technology can be removed.

In other words, for an energy-discriminating photon-counting detector, the pulse heights are compared to a number of programmable thresholds ($T_1$-$T_N$) in the comparators and classified according to pulse-height, which in turn is proportional to energy.

However, an inherent problem in any charge sensitive amplifier is that it will add electronic noise to the detected current. In order to avoid detecting noise instead of real X-ray photons, it is therefore important to set the lowest threshold value high enough so that the number of times the noise value exceeds the threshold value is low enough not to disturb the detection of X-ray photons.

By setting the lowest threshold above the noise floor, electronic noise, which is the major obstacle in the reduction of radiation dose of the X-ray imaging systems, can be significantly reduced The shaping filter has the general property that large values of the shaping time will lead to a long pulse caused by the X-ray photon and reduce the noise amplitude after the filter. Small values of the shaping time will lead to a short pulse and a larger noise amplitude. Therefore, in order to count as many X-ray photons as possible, a large shaping time is desired to minimize noise and allowing the use of a relatively small threshold level.

The values of the set or table of thresholds, by which the pulse heights are compared in the comparators, affect the quality of the image data generated by the photon-counting detector. Furthermore, these threshold values are temperature dependent [10]. Therefore, in an embodiment, the calibration data generated by the power-consuming circuitries is a set or table or thresholds ($T_1$-$T_N$).

In an embodiment, each power-consuming circuitry comprises multiple comparator configured to compare a current pulse generated in response to detection of a photon with a set of thresholds, see FIG. 7. The power-consuming circuitries of the at least a subset of the detector modules are then configured to select a respective calibration set among multiple different calibration sets based on the temperature representing signal. Each such calibration set defines values of the set of thresholds.

For instance, different calibration sets may be generated in a calibration procedure for different operational temperatures. It is in fact possible to generate such calibration sets for a relative large temperature span, such as 10-70° C. In such a case, each calibration set comprises values of the thresholds ($T_1$-$T_N$) adapted for a particular operational temperature t° C. or a particular operational temperature range $t_k$-$t_{k+1}$° C.

The calibration procedure, in which the calibration sets are generated, could be performed once, at scheduled time instances or in response to detected drifts or deteriorations in the image data. In an embodiment, a calibration procedure could be performed prior to the first X-ray imaging session of the day or at the beginning of each X-ray imaging session as illustrative but non-limiting examples.

In either case, the different calibration sets are then preferably stored in a memory or memories to be available for the power-consuming circuitries. In such a case, a power-consuming circuitry can select a suitable calibration set based on the temperature representative signal from a temperature sensor to thereby use threshold values in the comparators that are adapted to the current temperature on the detector module.

In a particular embodiment, the calibration sets are stored in the power-consuming circuitries, such as in the digital part of the power-consuming circuitries.

In another embodiment, the calibration sets are stored outside of the power-consuming circuitries and the detector modules. In such a case, the power-consuming circuitries select a respective calibration set by outputting the respective temperature representing signal to retrieve the appropriate calibration set from the external storage or memory.

According to the embodiment, the power to the photon-counting detector is turned on when it is used for image acquisition. A detector controller, which decides the power supply of the photon-counting detector is thereby used to implement the selective switches between the idle and operational modes. With the aid of the detector controller, the photon-counting detector can be set in an idle mode for which the power to the photon-counting detector is turned off and switch to an operational mode at image acquisition for which the power to the photon-counting detector is turned on. Note that the main power to the overall X-ray imaging system is constantly turned on after starting regardless of any duty cycle.

In clinical reality, a typical image acquisition time is less than 0.5 s. To stabilize the performance, the photon-counting detector may be powered on some time before the image acquisition, e.g., 0.1 s to 10 s before. The idle time between two successive uses of the X-ray imaging system is typically larger than 15 minutes according to the clinical statistics. On this way, the duty cycle will be only 1%. Of course, the image acquisition time can be much longer in some particular applications. But the duty cycle is considered to be less than 30%.

Accordingly, in an embodiment, the detector controller is configured to selectively switch, for the at least a subset of the multiple detector modules, the detector modules between the idle mode and the operational mode with a duty cycle of less than 30%. The duty cycle defines a total time during which the detector modules are in the operational mode, i.e., for image acquisition, relative to a total time of an X-ray imaging session.

In particular embodiments, the duty cycle is less than 25%, less than 20%, less than 15%, less than 10%, less than 5% or even less than 2.5% or 1%.

This means that for the larger part of an X-ray imaging session the detector controller controls the at least a subset of the detector modules to be in the idle mode, in which the power consumption and thereby heat generation by the detector modules and the photon-counting detector are reduced.

In an embodiment, the duty cycle is defined as $time_{operational}/(time_{idle}+time_{operational})$, wherein $time_{operational}$ defines the total time of an X-ray imaging session during which the detector modules are in the operational mode and $time_{idle}$ defines the total time of the X-ray imaging session during which the detector modules are in the idle mode.

Switching the at least a subset of the detector modules from the operational mode to the idle mode means that the heat generation by the detector modules is lowered, thereby lowering the temperature of the detector modules and the photon-counting detector. There will thereby be a temperature gradient going from high to low temperature. Correspondingly, switching the at least a subset of the detector modules from the idle mode to the operational mode implies that the heat generation by the detector modules is increased, thereby increasing the temperature of the detector modules and the photon-counting detector. There will thereby be a temperature gradient going from low to high temperature.

In order to allow the temperature gradient to progress for some time before image acquisition, the detector modules are preferably switched from the idle mode to the operational mode a short period of time prior to the image acquisition and the start of emission of X-rays from the X-ray source. Generally, when powering on the detector modules there will be an initial steep and rapid increase in temperature followed by a slower temperature increase. It may therefore be preferred to switch the detector modules from the idle mode to the operational mode a sufficient period of time in advance of the image acquisition to pass the initial steep temperature gradient, in which there is a rapid change, i.e., increase, in temperature. The reason being that the generated calibration data, such as selected calibration sets, may be outdated quickly if the temperature changes rapidly.

Hence, in an embodiment the detector controller is configured to switch, for the at least a subset of the multiple detector modules, the detector modules from the idle mode to the operational mode at a point in time within 0.1 to 10 s prior to start of emission of X-rays from an X-ray source. The photon-counting detector is then configured to detect X-rays from this X-ray source.

In particular embodiments, the detector controller switches the detector modules from the idle mode to the operational mode at a point in time within 0.1 to 5 s, 0.5 to 5 s, or 1 to 5 s prior to start of emission of X-rays from the X-ray source.

In an embodiment, the detector controller is configured to selectively switch, for the at least a subset of the multiple detector modules, the detector modules between the idle mode in which the detector modules are powered off and the operational mode in which the detector modules are powered on.

Hence, in this embodiment the total power to the detector modules of this at least a subset is turned off in the idle mode. For instance, the power to the power-consuming circuitries of these detector modules is turned off.

In another embodiment, only part of the detector modules in the at least a subset is turned off in the idle mode. This means that the respective part of the detector modules is powered off whereas a respective remaining part of the detector modules is powered on during the idle mode. In this approach, generally some power will be consumed by the detector modules even during the idle mode and thereby some heat will be generated during the idle mode. However, the power-consumption and the heat generation are still significantly lower as compared to having the complete detector modules powered on in the operational mode.

Figure 9:
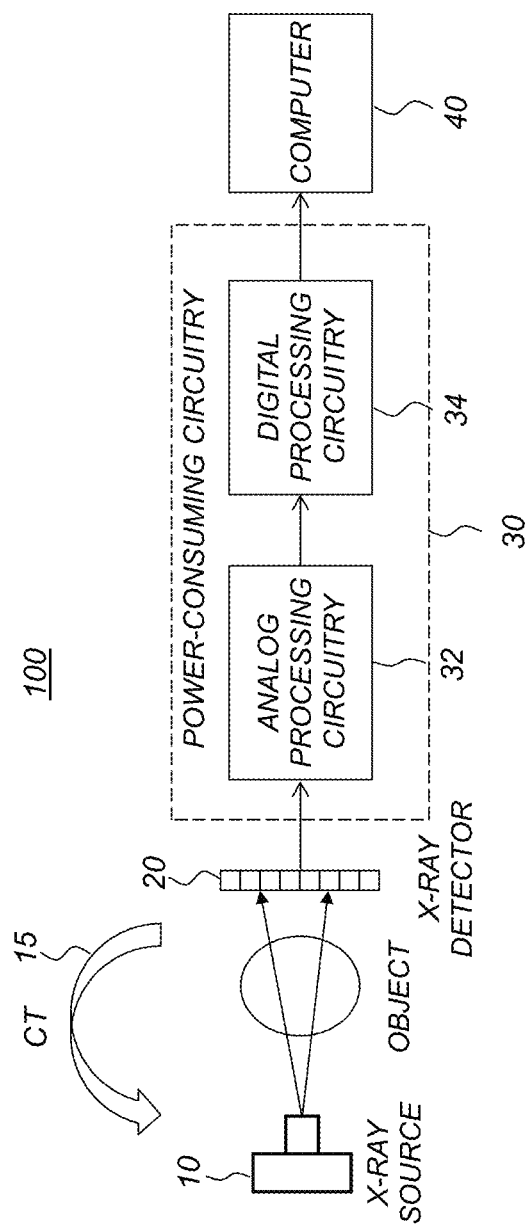
FIG. 9 is a schematic block diagram of an X-ray imaging system according to a further embodiment.

As illustrated in FIG. 9, another example of an X-ray imaging system 100 comprises an X-ray source 10, which emits x-rays; an X-ray detector system 20, which detects the X-rays after they have passed through the object; a power-consuming circuitry 30, such as ASIC, integrated in the detector modules of the photon-counting detector. In an embodiment, the power-consuming circuitry 30 comprising analog processing circuitry 32, which processes the raw electrical signal from the detector elements and digitizes it, and digital processing circuitry 34 which may carry out further processing operations on the measured data, such as applying corrections, storing it temporarily, or filtering. The X-ray imaging system 100 also comprises a computer 40, which stores the processed data and may perform further post-processing and/or image reconstruction.

An example of a commonly used X-ray imaging system is a CT system, which may include an X-ray source 10 that produces a fan or cone beam of X-rays and an opposing X-ray detector system 20 for registering the fraction of X-rays that are transmitted through a patient or object. The X-ray source 10 and photon-counting detector are normally mounted in a gantry that rotates around the imaged object as indicated by the arrow 15.

Thus, in an embodiment each power-consuming circuitry comprises analog processing circuitry and digital processing circuitry. The detector controller is then configured to selectively switch, for the least a subset of the multiple detector modules and while maintaining the digital processing circuitry powered on, the analog processing circuitry between the idle mode in which the analog processing circuitry is powered off and the operational mode in which the analog processing circuitry is powered on.

Hence, in this embodiment, the respective analog processing circuitry of the detector modules is selectively switched between the idle mode and the operational mode while the respective digital processing circuitry of the detector modules is maintained powered on.

In this embodiment, the switch between the idle and the operational mode is only applied to the most power-consuming part of the detector modules. For example, the analog parts of the ASICs, which consume over 80% of the total power of the photon-counting detector [9], are turned on and off according to a duty cycle. The digital parts of the ASICs where the calibration data is preferably stored and applied is turned on continuously. This embodiment achieves a significant advantage. Firstly, the most power-consuming and thereby the most heat-generating part of the detector modules, i.e. the analog processing circuitry (analog part of the ASICs), is selectively switched off and thereby powered off in between image acquisitions. However, the digital processing circuitry (digital part of the ASICs) is preferably powered on during the complete X-ray imaging session. The reason being that if the digital processing circuitry is powered down in between image acquisitions, it may take a long time to reload calibration data. Hence, the need for reloading such calibration data each and every time the detector controller switches the detector modules from the idle mode to the operational mode is thereby relaxed.

Figure 11:
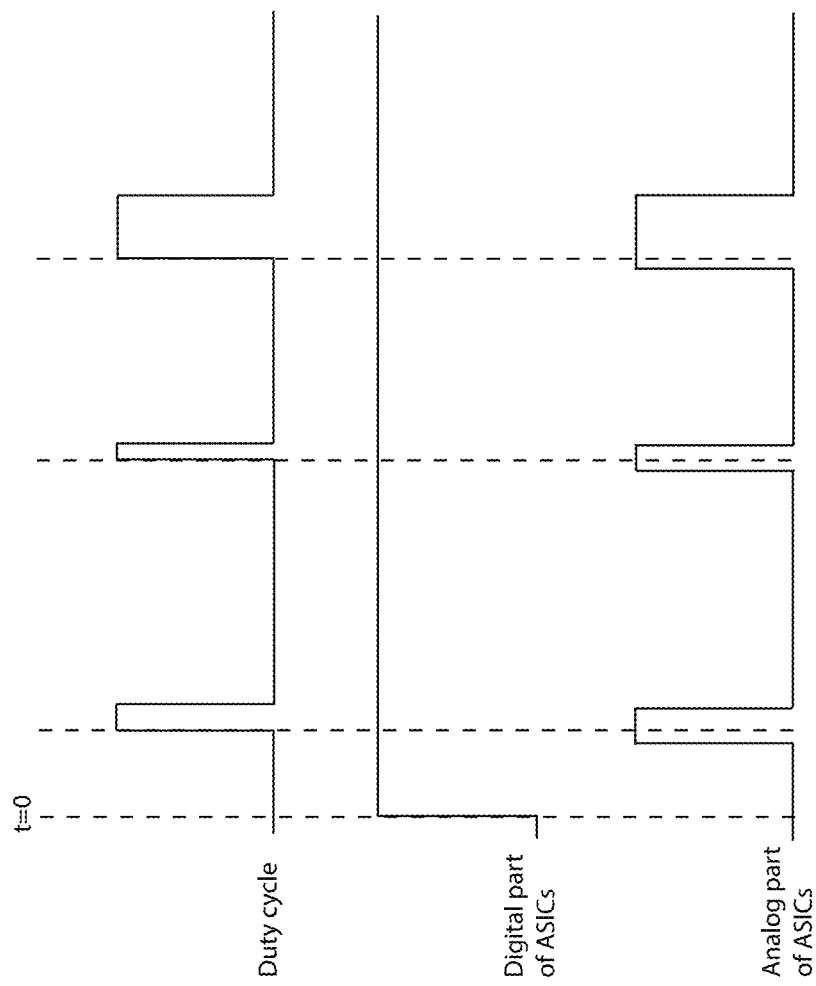
FIG. 11 is a diagram illustrating a duty cycle and corresponding power supply to a photon-counting detector according to an embodiment.

FIG. 11 is a diagram illustrating a duty cycle and corresponding power supply to a photon-counting detector according to an embodiment. The upper portion of the diagram illustrates the duty cycle of an X-ray imaging session. In this illustrative example, the X-ray imaging session involves three image acquisition periods followed by comparatively longer "silent" periods during which there is no X-ray emission nor detection.

In this illustrative example, the digital part of the ASICs is powered on during the complete X-ray imaging session as illustrated in the middle portion of the diagram. This relaxes the need for reloading calibration data by the digital part, which otherwise would occur each time the digital part of the ASICs is powered on.

The lower portion of the diagram illustrates the selective switches of the analog part of the ASICs between the idle mode, in which the analog part is powered off, and the operational mode, in which the analog part is powered on.

In an embodiment and as shown in the diagram, the analog part of the ASICs is switched from the idle mode to the operational mode a short period of time prior to the start of the X-ray emission (represented by the hatched vertical lines). This means that the analog part is fully operational and the temperature increase has had time to stabilize a bit prior to start of image acquisition.

Another aspect of the embodiments relates to an X-ray detector system. In this aspect, the X-ray detector system comprises a photon-counting detector comprising multiple detector modules. Each detector module has processing circuitry comprising analog processing circuitry and digital processing circuitry. The X-ray detector system also comprises, in this aspect, a detector controller connected to the photon-counting detector. The detector controller is configured to selectively switch, for at least a subset of the multiple detector modules and while maintaining the digital processing circuitry powered on, the analog processing circuitry between an idle mode in which the analog processing circuitry is powered off and an operational mode in which the analog processing circuitry is powered on.

Hence, this aspect of the embodiments does not necessarily comprises any temperature sensor nor the generation of calibration data based on temperature representative signals.

The selective switch between the idle mode and the operational mode can be performed for all detector modules in the photon-counting detector. In such a case, the power-consuming circuitries of all these detector modules are powered down during the idle mode and then powered on during the operational mode. Alternatively, a part of the power-consuming circuitries, such as the analog part, is powered down during the idle mode, whereas a remaining part of the power-consuming circuitries, such as the digital part, is powered on during the idle mode. During the operational mode the power-consuming circuitries, i.e., the analog and digital parts, are powered on.

In another embodiment, the switch between the idle mode and the operational mode is applied only to a subset of the detector modules instead of all detector modules in the photon-counting detector. For example, the peripheral detectors modules that are located on the sides of the photon-counting detector are powered on and off according to a duty cycle while the central detector modules are powered on constantly. This is schematically illustrated in FIG. 3, in which the central subset of the detector modules are indicated by a hatched ring and the peripheral subsets of detector modules are arranged on respective sides of the central subset.

This embodiment may be advantageous since the central detector modules are typically always collecting useful information during scans and imaging acquisition no matter the size of the object to be imaged. By keeping these "most important" central detector modules powered on, any temperature changes and gradients on these central detector modules are minimized. This in turn implies that any temperature-induced changes or deteriorations to the image data are avoided or at least reduced and thereby the need for calibrations of such temperature-induced changes for the image data output from the central detector modules is reduced.

The peripheral detector modules generally collect less information or even un-attenuated X-rays, which is less important for the image reconstruction. These peripheral detector modules constitute in most practical applications the majority of the detector modules in the photon-counting detector. For instance, the peripheral detector modules may constitute about 75-80% of the total number of detector modules in the photon-counting detector. Thus, selectively switching these peripheral detector modules between the idle mode and the operational mode would significantly reduce the power consumption and the heat generation from the photon-counting detector.

Thus, this embodiment would significantly reduce the total power consumption and heat generation by a photon-counting detector while reducing the risk of temperature-induced changes and deterioration in image data generated by the most important central detector modules and thereby relaxing the need for performing calibration during image acquisition in all detector modules.

Hence, in an embodiment, the photon-counting detector comprises a central subset of detector modules and at least one peripheral subset of detector modules arranged on a respective side of the central subset along an axis (see dotted curve in FIG. 3) of the photon-counting detector. In this embodiment, the detector controller is configured to selectively switch, while maintaining the power-consuming circuitry of the central subset of detector modules powered on, the at least one peripheral subset of detector modules between the idle mode and the operational mode.

A further aspect of the embodiments relates to an X-ray detector system. In this aspect, the X-ray detector system comprises a photon-counting detector comprising a central subset of detector modules and at least one peripheral subset of detector modules arranged on a respective side of the central subset along an axis of the photon-counting detector. Each detector module has power-consuming circuitry. In this aspect, the X-ray detector system also comprises a detector controller connected to the photon-counting detector. The detector controller is configured to selectively switch, while maintaining the power-consuming circuitry of the central subset of detector modules powered on, the at least one peripheral subset of detector modules between an idle mode in which the power-consuming circuitry is powered off and an operational mode in which the power-consuming circuitry is powered on.

Hence, this aspect of the embodiments does not necessarily comprises any temperature sensor nor the generation of calibration data based on temperature representative signals.

The invention as disclosed herein encompasses various embodiments. In an embodiment, the detector controller is configured to selectively switch all the detector modules between the idle mode and the operational mode. In another embodiment, the detector controller is configured to selectively switch only a subset of the detector modules between the idle mode and the operational mode while maintaining remaining detector modules powered on. In a particular embodiment, the subset of detector models is the central subset of detector modules and the remaining detector modules are peripheral subset(s) of detector modules.

In addition, in an embodiment, in the idle mode a detector module is fully powered off or down, whereas in the operational mode the detector module is fully powered on. In a particular embodiment, in the idle mode, the power-consuming circuitry of the detector module is fully powered off or down, whereas the in the operational mode the power-consuming circuitry is fully powered on. In another embodiment, a part of the detector module is powered off or down in the idle mode while a remaining part of the detector module is powered on, whereas the detector module is powered on in the operational mode. In a particular embodiment, a part of the power-consuming circuitry of a detector module, such as the analog part, is powered off or down in the idle mode while maintaining a remaining part of the power-consuming circuitry, such as the digital part, powered on. In the operational mode the power-consuming circuitry, including the analog and digital parts, is powered on. These embodiments of powering off or down the complete or a part of the detector module or the power-consuming circuitry thereof can be combined with any of the embodiments disclosed above relating to selectively switching all or a subset of the detector modules between the idle and operational modes.

Figure 8:
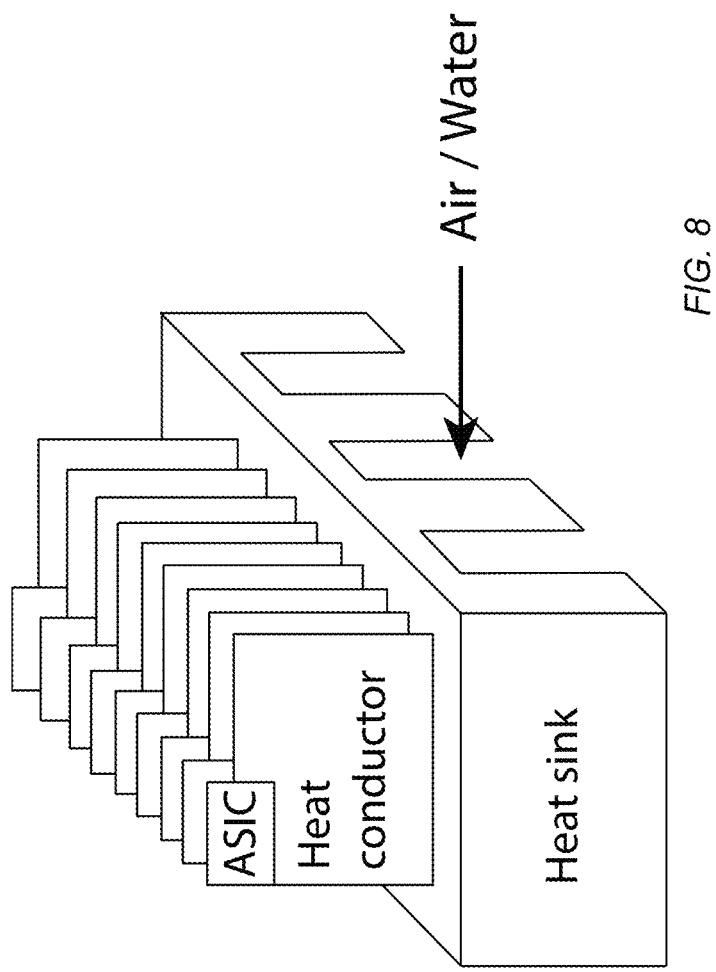
FIG. 8 is a schematic diagram of heat dissipation of a photon-counting detector according to an embodiment.

The at least a subset of multiple detector modules that the detector controller selectively switches between the idle and operational mode could be the same at least a subset of multiple detector modules that comprises a respective temperature sensor. For instance, N out of M≥N detector modules of the photon-counting detector comprises a respective temperature sensor and the detector controller is then configured to selectively switch these N detector modules between the idle and operational modes. In another embodiment, N out of M≥N detector modules of the photon-counting detector comprises a respective temperature sensor and the detector controller is configured to selectively switch P out of the M≥P detector modules between the idle and operational modes. In this case, the P detector modules could be a subset of the N detector modules, the N detector modules could be a subset of the P detector modules or the P detector modules and the N detector modules could be at least partly overlapping sets of detector modules, i.e., some detector modules belong to both the P detector modules and the N detector modules, whereas other detector modules belong to the P (or N) detector modules but not the N (or P) detector modules, or does not belong to either of the P or N detector modules In an embodiment, the photon-counting detector is connected with a heat conductor from the front-end ASIC to a heat sink as illustrated in FIG. 8. The heat conductor is, in an embodiment, made of aluminum nitride since its temperature expansion coefficient is matched to silicon. In an embodiment, the heat sink is made of aluminum due to its comparatively low density, thereby reducing the weight of the heat sink. Ambient air or water can be used to take away the heat from the heat sink.

Hence, in an embodiment, the photon-counting detector comprises a heat sink and multiple heat conductors. Each heat conductor interconnects a power-consuming circuitry of a detector module and the heat sink.

In an embodiment, the multiple heat conducts are made of aluminum nitride. In an embodiment, the heat sink is made of aluminum.

Figure 10:
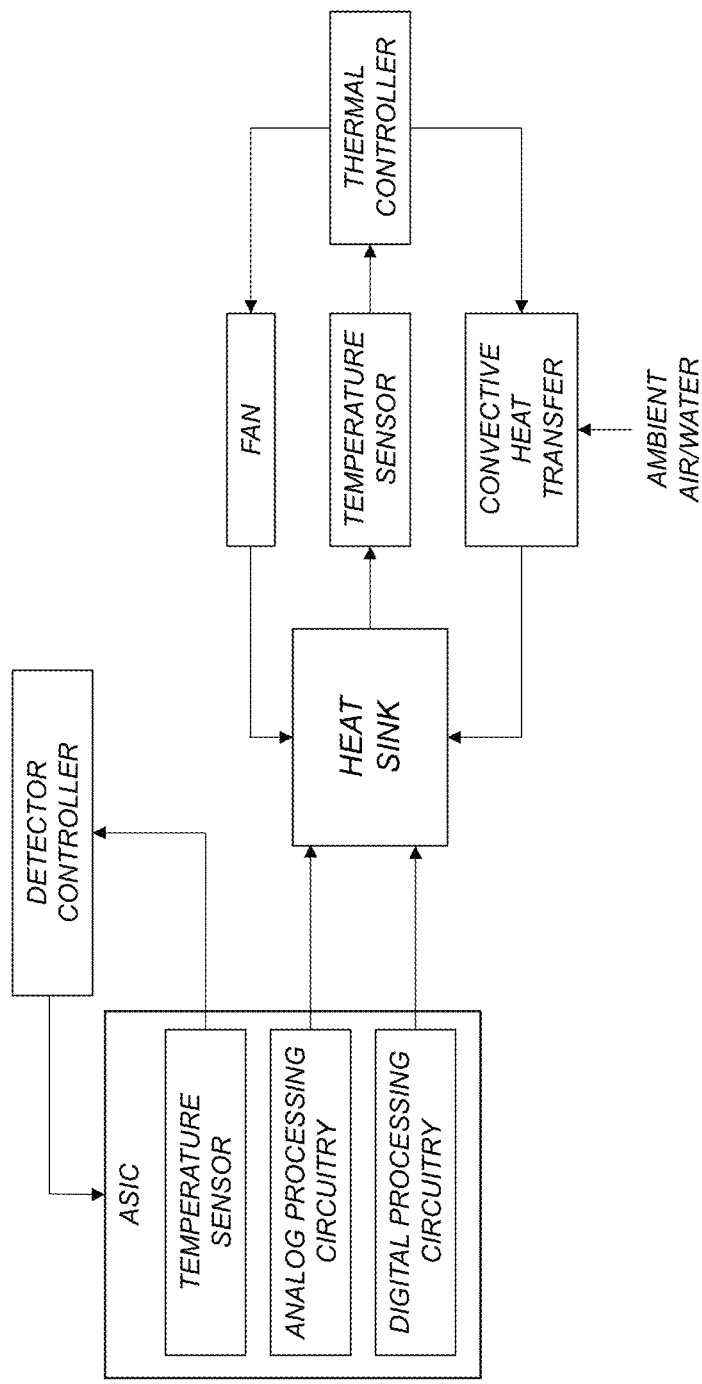
FIG. 10 is a schematic block diagram of thermal management of a photon-counting detector according to an embodiment.

A simplified model for the thermal management system of the photon-counting detector is shown in FIG. 10. After the X-ray imaging system has been turned on, the digital processing circuitries of the photon-counting detector is, in an embodiment, continuously powered on, which delivers heat to the heat sink constantly. Convective heat transfer and a fan help to spread the heat out from the photon-counting detector and the heat sink and thereby keep the photon-counting detector at a generally constant temperature. In case of image acquisition, the analog processing circuitries of the photon-counting detector are powered on, during which much more heat needs to be transferred away. Then, the power to the fan and the convective heat transfer will be applied as a function of the temperature by a thermal controller. After the image acquisition, the photon-counting detector will be cooled again with the aid of the fan and the convective heat transfer, and by turning off the analog processing circuitries to thereby reduce the heat generation by the photon-counting detector.

Figure 12A:
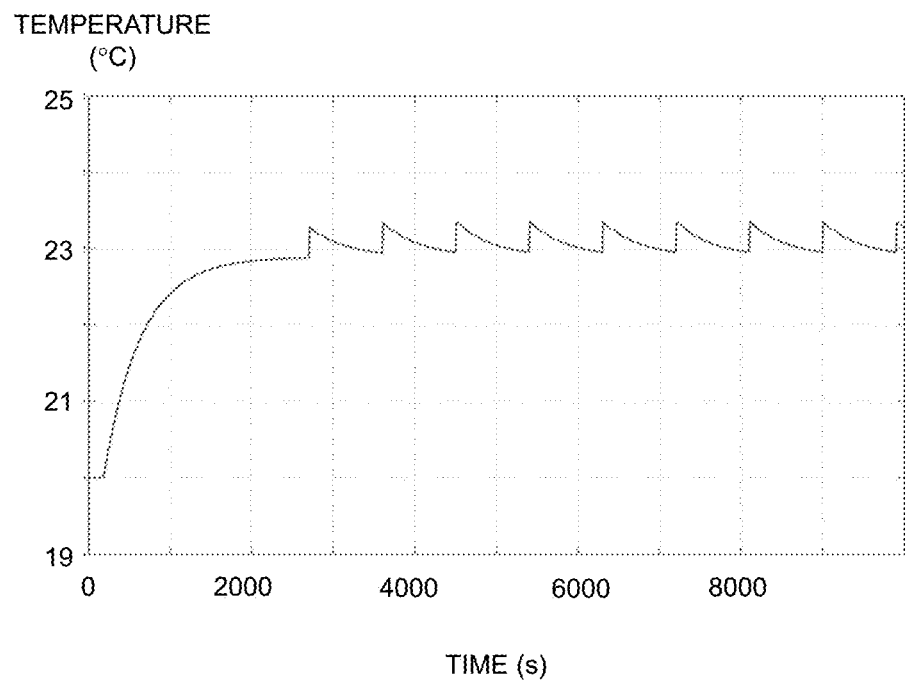
FIGS. 12A and 12B are diagrams of temperature curves of a heat sink as illustrated in FIG. 10.

By inputting reasonable parameters in the simplified model illustrated in FIG. 10, the temperature curve can be simulated for the heat sink with the aid of Simulink. Two example duty cycles are used. The first one is 1% pulse width over a period of 900 seconds, which is designed to simulate the clinical use. The result is shown in FIG. 12A. The second duty cycle is 15% pulse width over a period of 690 seconds, which is designed to simulate the extreme condition in clinical use. The result is shown in FIG. 12B.

Figure 12B:
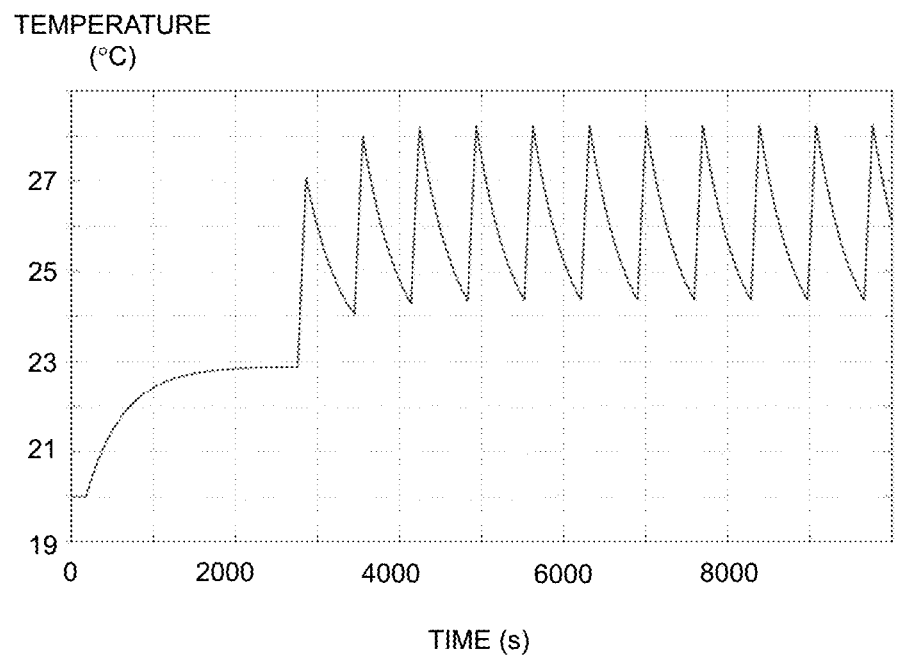

In both FIGS. 12A and 12B, the temperature curves reach a plateau due to the selective switch of the analog parts of the ASICs, while keeping the digital parts of the ASICs turned on continuously after started. The selective switches of the analog parts of the ASICS cause the temperature curve to have ups and downs in a controlled way. The maximum temperature obtained in the simulations is around 28° C. for the heat sink, while the temperature on the photon-counting detector could be 5 to 6° C. higher. In this way, the operating temperature for the photon-counting detector will be lower than 36° C., which is the typical operating temperature for a modern CT detector. This in turn will increase the performance of the photon-counting detector in terms of noise and consequently, the image quality, compared to other X-ray detectors.

Another aspect of the embodiments relates to an X-ray imaging system, see FIG. 2. The X-ray imaging system comprises an X-ray source configured to emit X-rays and an X-ray controller connected to the X-ray source and configured to control emission of X-rays from the X-ray source. The X-ray imaging system also comprises an X-ray detector system according to the embodiments comprising a photon-counting detector and a detector controller. In an embodiment, the detector controller is configured to selectively switch, for the at least a subset of the multiple detector modules, the detector modules between the idle mode and the operational mode while power of the X-ray source and the X-ray controller is on.

Thus, the selectively switch of detector modules between the idle mode and the operational mode is taking place during an X-ray imaging session in which the main power of the X-ray imaging system is on.

In an embodiment, the detector controller is configured to selectively turn, while power of the X-ray source and the X-ray controller is on, off power to the at least a part of the power-consuming circuitry of the at least a subset of the multiple detector modules in connection with the X-ray controller controlling a stop of emission of X-rays from the X-ray source.

For instance, the detector controller could be configured to selectively turn, while power of the X-ray source and the X-ray controller is on, off power to the at least a part of the power-consuming circuitry of the at least a subset of the multiple detector modules in synchrony with the X-ray controller controlling a stop of emission of X-rays from the X-ray source.

This is schematically illustrated in FIG. 11, in which the analog part of the ASICs is powered down in synchrony with the X-ray controller controlling stop of emission of X-rays from the X-ray source.

In an embodiment, the detector controller is configured to selectively turn, while power of the X-ray source and the X-ray controller is on, on power to the at least a part of the power-consuming circuitry of the at least a subset of the multiple detector modules at a point in time preceding the X-ray controller controlling a start of emission of X-rays from the X-ray source.

This is also schematically illustrated in FIG. 11, in which the analog part of the ASICs is powered on slightly in advance of the X-ray controller controlling start of emission of X-rays from the X-ray source.

Figure 14:
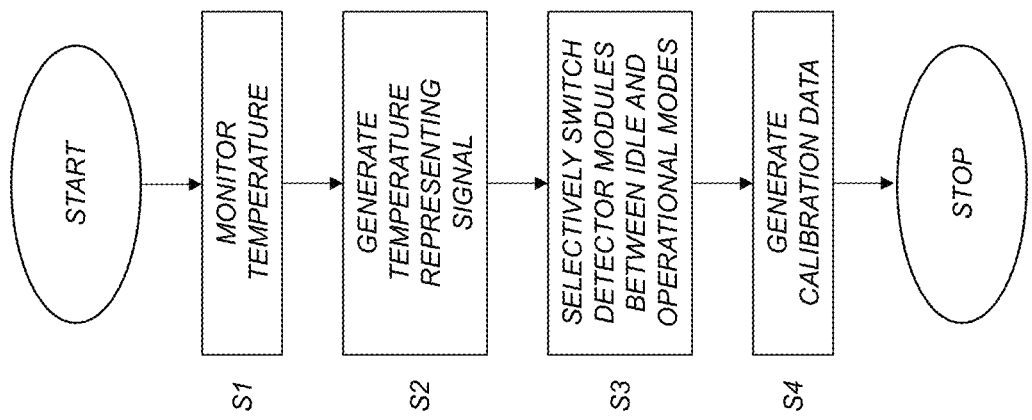
FIG. 14 is a flow chart illustrating a method of thermal control of a photon-counting detector according to an embodiment.

FIG. 14 is a flow chart illustrating a method of thermal control of an X-ray detector system. The method comprises monitoring, in step S1, temperatures on at least a (first) subset of multiple detector modules in a photon-counting detector. The method also comprises generating, in step S2 and for each detector module of the at least a (first) subset of the multiple detector modules, a temperature representing signal based on the monitoring. The method further comprises selectively switching, in step S3 and for at least a (second or the first) subset of multiple detector modules, the detector modules between an idle mode in which at least a respective part of the detector modules is powered off and an operational mode in which the detector modules are powered on. The method additionally comprises generating, in step S4, calibration data based on a respective temperature representative signal to correct for any temperature-induced changes to image data generated by the photon-counting detector.

In an embodiment, step S4 comprises generating, by power-consuming circuitries of the (second or first) subset of the multiple detector modules, the calibration data based on the respective temperature representative signal to correct for any temperature-induced changes to image data generated by the photon-counting detector.

It will be appreciated that the methods, devices and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

For instance, the detector controller of the X-ray detector system can be in the form of a processor-memory implementation according to an embodiment. In this particular example, the detector controller comprises a processor and a memory. The memory comprises instructions executable by the processor, whereby the processor is configured to selectively switch the detector modules between the idle and operational modes.

In another embodiment, the detector controller can be in the form of a hardware circuitry implementation according to an embodiment. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM).

It is also possible to provide a solution based on a combination of hardware and software. The actual hardware-software partitioning can be decided by a system designer based on a number of factors including processing speed, cost of implementation and other requirements.

Figure 13:
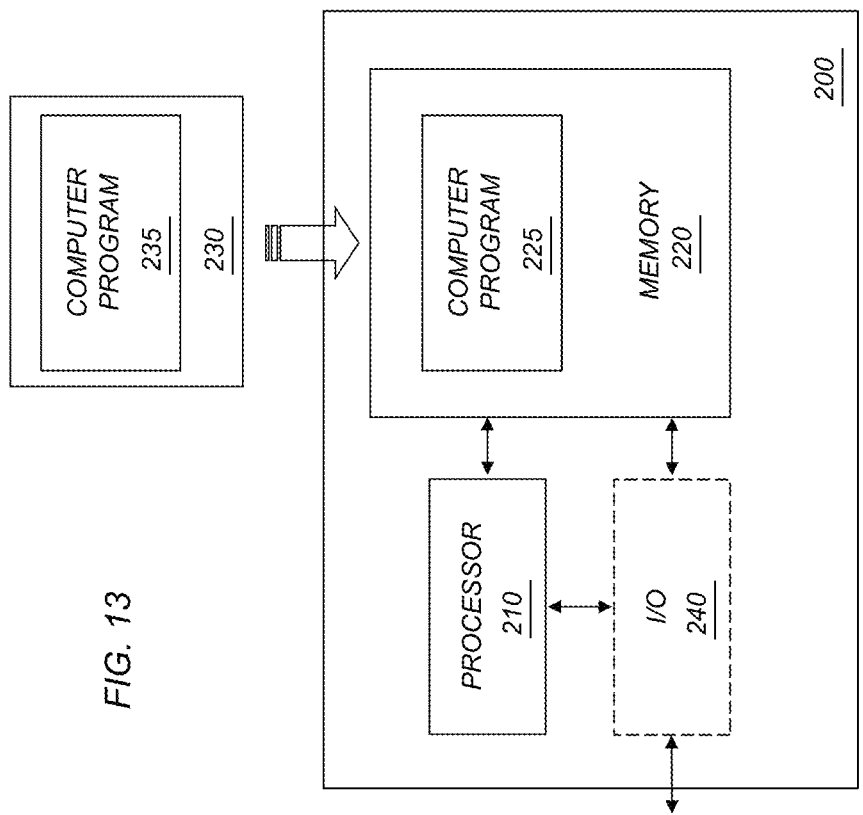
FIG. 13 is a schematic block diagram illustrating an example of computer implementation according to an embodiment.

FIG. 13 is a schematic diagram illustrating an example of a computer-implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

The proposed technology also provides a computer program 225; 235 comprising instructions, which when executed by at least one processor 210, cause the at least one processor 210 to selectively switch, for at least a subset of multiple detector modules in a photon-counting detector, the detector modules between an idle mode in which at least a respective part of the detector modules is powered off and an operational mode in which the detector modules are powered on. The at least one processor 210 is also caused to generate, based on a respective temperature representing signal representing a respective temperature on at least a subset of the multiple detector modules, calibration data to correct for any temperature-induced changes to image data generated by the photon-counting detector.

The proposed technology also provides a carrier 230 comprising the computer program 235. The carrier 230 is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 225; 235 may thus be loaded into the operating memory 220 of a computer or equivalent processing device 200 for execution by the processing circuitry 210 thereof.

The flow diagram or diagrams presented herein may be regarded as a computer flow diagram or diagrams, when performed by one or more processors. A corresponding devcie may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

In an embodiment, such a device comprises a switching module for selectively switching, for at least a subset of multiple detector modules in a photon-counting detector, the detector modules between an idle mode in which at least a respective part of the detector modules is powered off and an operational mode in which the detector modules are powered on. The device also comprises a calibration generating module for generating, based on a respective temperature representing signal representing a respective temperature on at least a subset of the multiple detector modules, calibration data to correct for any temperature-induced changes to image data generated by the photon-counting detector.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] U.S. Pat. No. 7,065,173
[2] U.S. Pat. No. 6,931,092
[3] U.S. Pat. No. 7,236,562
[4] U.S. Patent Application No. 2016/0174920
[5] U.S. Pat. No. 9,086,360
[6] Alvarez and Macovski. Energy-selective reconstructions in X-ray computerised tomography. Phys. Med. Biol., 21(5):733, 1976.
[7] Roessl and Proksa. K-edge imaging in X-ray computed tomography using multi-bin photon counting detectors. Phys. Med. Biol., 52(15):4679, 2007.
[8] Liu, Gronberg, Sjolin, Karlsson and Danielsson, "Count rate performance of a silicon-strip detector for photon-counting spectral CT", Nucl. Instr. and Meth. A, Volume 827, p. 102-106. 2016.
[9] Gustavsson, Amin, Bjorklid, Ehliar, Xu and Svensson. A high-rate energy-resolving photon-counting ASIC for spectral computed tomography. IEEE Transactions on Nuclear Science, 59(1), 30-39, 2012.
[10] Bornefalk, Persson, Xu, Karlsson, Svensson and Danielsson, "Effect of Temperature Variation on the Energy Response of a Photon Counting Silicon CT Detector", IEEE Trans. Nucl. Sci., 60(2):1442-1449, 2013

The invention claimed is:

1. An X-ray detector system comprising:
a photon-counting detector comprising multiple detector modules, each detector module comprises power-consuming circuitry and at least a subset of said multiple detector modules comprises a temperature sensor configured to monitor a temperature on said detector module and generate a temperature representative signal; and
a detector controller connected to said photon-counting detector and configured to selectively switch, for at least a subset of said multiple detector modules, said detector modules between an idle mode in which at least a respective part of said detector modules is powered off and an operational mode in which said detector modules are powered on, wherein power-consuming circuitries of said at least a subset of said detector modules are configured to generate calibration data based on a respective temperature representative signal to correct for any temperature-induced changes to image data generated by said photon-counting detector.

2. The X-ray detector system according to claim 1, wherein each temperature sensor is integrated in a respective power-consuming circuitry of said at least a subset of said multiple detector modules.

3. The X-ray detector system according to claim 1, wherein each power-consuming circuitry is a respective application specific integrated circuit, ASIC.

4. The X-ray detector system according to claim 1, wherein each temperature sensor is an oscillator-based temperature sensor configured to measure a frequency change in an oscillator implemented in a respective power-consuming circuitry of said at least a subset of said multiple detector modules.

5. The X-ray detector system according to claim 1, wherein
each power-consuming circuitry comprises multiple comparators configured to compare a current pulse generated in response to detection of a photon with a set of thresholds; and
said power-consuming circuitries of said at least a subset of said detector modules are configured to select a respective calibration set among multiple different calibration sets based on said temperature representing signal, each calibration set defines values of said set of thresholds.

6. The X-ray detector system according to claim 1, wherein said detector controller is configured to selectively switch, for said at least a subset of said multiple detector modules, said detector modules between said idle mode and said operational mode with a duty cycle of less than 30%, wherein said duty cycle define a total time during which said detector modules are in said operational mode relative to a total time of an X-ray imaging session.

7. The X-ray detector system according to claim 1, wherein
said detector controller is configured to switch, for said at least a subset of said multiple detector modules, said detector modules from said idle mode to said operational mode at a point in time within 0.1 to 10 s prior to start of emission of X-rays from an X-ray source; and
said photon-counting detector is configured to detect X-rays from said X-ray source.

8. The X-ray detector system according to claim 1, wherein
each power-consuming circuitry comprises analog processing circuitry and digital processing circuitry; and
said detector controller is configured to selectively switch, for said at least a subset of said multiple detector modules and while maintaining said digital processing circuitry powered on, said analog processing circuitry between said idle mode in which said analog processing circuitry is powered off and said operational mode in which said analog processing circuitry is powered on.

9. The X-ray detector system according to claim 1, wherein said photon-counting detector comprises multiple semiconductor detector modules.

10. The X-ray detector system according to claim 9, wherein said photon-counting detector comprises multiple silicon detector modules.

11. The X-ray detector system according to claim 1, wherein
said photon-counting detector is a photon-counting edge-on detector and each detector module having a respective edge facing incident X-rays; and
a total area of said edges of said multiple detector modules is greater than 200 cm$^2$.

12. The X-ray detector system according to claim 1, wherein
said photon-counting detector comprises:
a central subset of detector modules; and
at least one peripheral subset of detector modules arranged on a respective side of said central subset along an axis of said photon-counting detector; and
said detector controller is configured to selectively switch, while maintaining said power-consuming circuitry of said central subset of detector modules powered on, said at least one peripheral subset of detector modules between said idle mode and said operational mode.

13. The X-ray detector system according to claim 1, further comprising:
a heat sink; and
multiple heat conductors, wherein each heat conductor interconnects said power-consuming circuitry of a detector module and said heat sink.

14. The X-ray detector system according to claim 13, wherein said multiple heat conductors are made of aluminum nitride.

15. An X-ray imaging system comprising:
an X-ray source configured to emit X-rays;
an X-ray controller connected to said X-ray source and configured to control emission of X-rays from said X-ray source; and
an X-ray detector system according to claim 1, wherein said detector controller is configured to selectively switch, for said at least a subset of said multiple detector modules, said detector modules between said idle mode and said operational mode while power of said X-ray source and said X-ray controller is on.

16. The X-ray imaging system according to claim 15, wherein said detector controller is configured to selectively turn, while power of said X-ray source and said X-ray controller is on, off power to said least a part of said power-consuming circuitry of said at least a subset of said multiple detector modules in connection with said X-ray controller controlling a stop of emission of X-rays from said X-ray source.

17. The X-ray imaging system according to claim 16, wherein said detector controller is configured to selectively turn, while power of said X-ray source and said X-ray controller is on, off power to said least a part of said power-consuming circuitry of said at least a subset of said multiple detector modules in synchrony with said X-ray controller controlling a stop of emission of X-rays from said X-ray source.

18. The X-ray imaging system according to claim 15, wherein said detector controller is configured to selectively turn, while power of said X-ray source and said X-ray controller is on, on power to said least a part of said power-consuming circuitry of said at least a subset of said multiple detector modules at point in time preceding said X-ray controller controlling a start of emission of X-rays from said X-ray source.

19. A non-transitory computer readable medium comprising instructions stored thereon, which when executed by at least one processor, cause said at least one processor to
selectively switch, for at least a subset of multiple detector modules in a photon-counting detector, said detector modules between an idle mode in which at least a respective part of said detector modules is powered off and an operational mode in which said detector modules are powered on; and
generate, based on a respective temperature representing signal representing a respective temperature on at least a subset of said multiple detector modules, data calibration to correct for any temperature-induced changes to image data generated by said photon-counting detector.

20. A method of thermal control of an X-ray detector system, said method comprising:
- monitoring temperatures on at least a subset of multiple detector modules in a photon-counting detector;
- generating, for each detector module of said at least a subset of said multiple detector modules, a temperature representing signal based on said monitoring;
- selectively switching, for at least a subset of said multiple detector modules, said detector modules between an idle mode in which at least a respective part of said detector modules is powered off and an operational mode in which said detector modules are powered on; and
- generating calibration data based on a respective temperature representative signal to correct for any temperature-induced changes to image data generated by said photon-counting detector.

* * * * *